(No Model.)
N. & J. FORSHAW.
STEAM CULINARY VESSEL.
No. 340,995. Patented May 4, 1886.
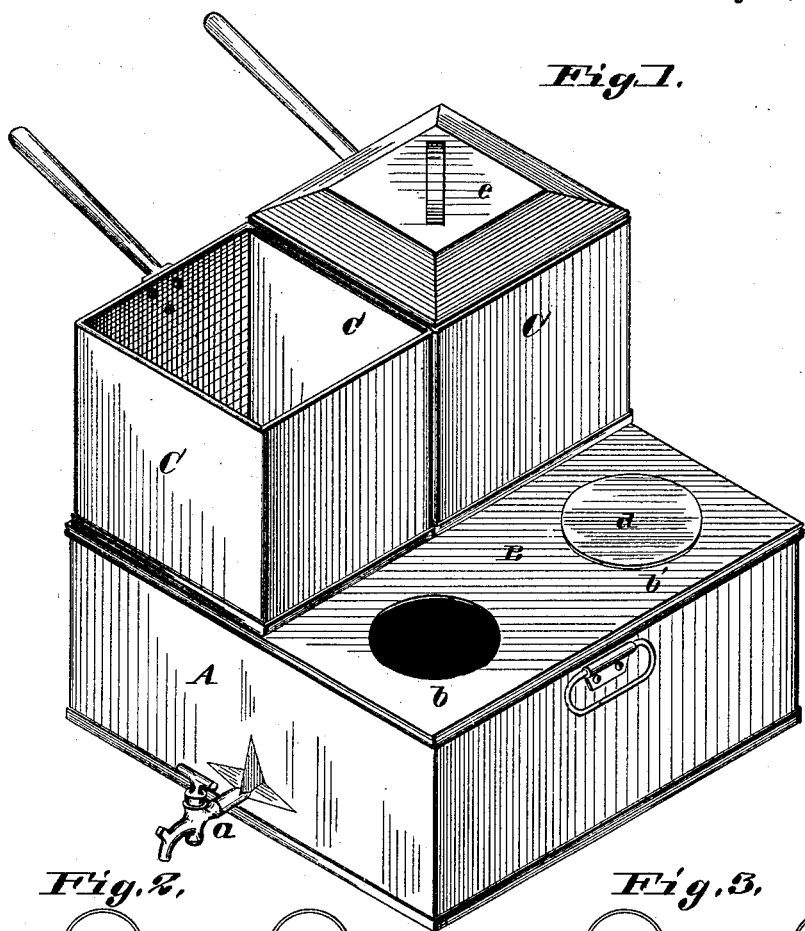
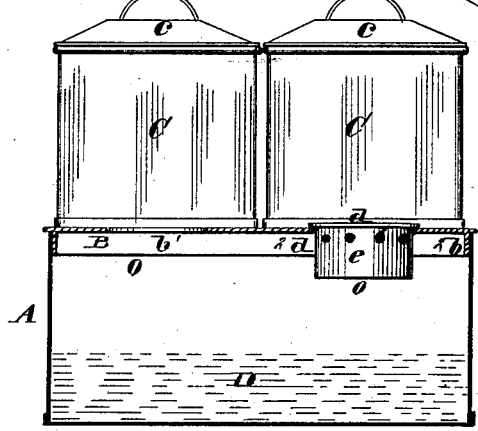
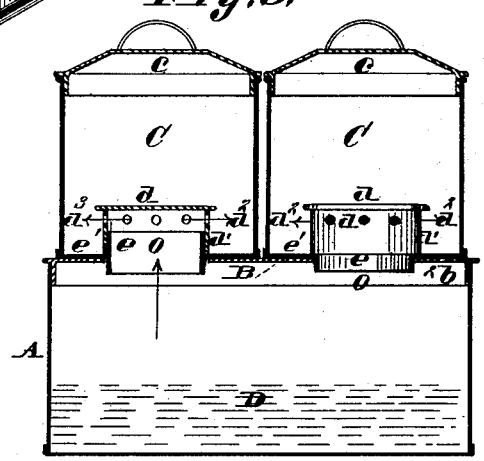
Attest:
A. E. Huff.
H. M. Thompson.
Inventors,
Nathan Forshaw
Joseph Forshaw

UNITED STATES PATENT OFFICE.

NATHAN FORSHAW AND JOSEPH FORSHAW, OF ST. LOUIS, MISSOURI.

STEAM CULINARY-VESSEL.

SPECIFICATION forming part of Letters Patent No. 340,995, dated May 4, 1886.

Application filed June 26, 1885. Serial No. 169,901. (No model.)

*To all whom it may concern:*

Be it known that we, NATHAN FORSHAW and JOSEPH FORSHAW, both of the city of St. Louis, in the State of Missouri, have invented a certain new and useful Improvement in Steam Culinary-Vessels, of which the following is a full, clear, and exact description, reference being had to the accompanying drawings, forming a part of this application and specification, in which—

Figure 1 is a perspective view, with one hole in the heating-shelf open and one hole closed and two of the cooking-vessels in position. Fig. 2 is a vertical section through the heating shelf and pan, with one hole open and one closed. Fig. 3 is a vertical section through the pan, cover, and cooking-vessels, with one cap-cover in elevation and one in section.

Our invention is for a device to be used for culinary purposes, for cooking and heating by steam, and is adapted to gas, gasoline, and all other kinds of stoves.

It consists in the novel and improved features described and set forth herein.

A in the drawings represents a metallic pan or vessel for holding water. In form it is preferably square, though it may be round, oval, or of other shape. Its bottom is closed water-tight. The top is open its full size. The depth is as required for quantity of water, D, for use. In one of its sides is a cock, a, for convenience in drawing water.

B represents the removable cover or heating-shelf, formed when a part or all of the cooking-vessels are removed and the covers d, Fig. 1, are placed therein. This cover is made of metal, and has a projecting rim, $b^2$, Figs. 2 and 3, on its under surface, which shuts telescoping into the water-heater A closely. One or more perforations, b b', of any desirable size are made through this cover, into which the projecting part e of the bottom of the cooking-vessels C are loosely placed removable. These holes or openings are covered, when the cooking-vessel C is removed, by the covers d, which are made of suitable sizes for alternate use in the vessel C, or as covers to the openings b b' in the shelf or cover B.

The cooking-vessels C are preferably square in form, and may be of any sizes desired, and as many of them made use of as circumstances require for cooking various things simultaneously or separately. By this means the cooking-vessels are all on the same surface or level, and each one readily accessible for removing or replacing the same when in use, differing in this respect from ordinary devices for steaming food.

The cooking-vessels C are constructed as shown in Fig. 3. They have a close cover, c, at their top. Their bottoms are perforated centrally with a suitable-sized opening, o, into which a rim-ring, e, is closely fastened water-tight, and projects about one inch or so, both below the bottom of the vessel and upward within it. The projection within the vessel is sufficiently high to retain any dripping by steam from the food cooking within it, and not allow it to drop into the hot water in the vessel A below it, and thereby contaminate it. The projection e below the bottom e' fits snugly, but loosely, into the hole b in the cover B, so the cooking-vessel may be readily removed.

The covers d, Figs. 2 and 3, have the perforations $d^2$ $d^2$, through their walls, through which the steam from the vessel A and water D below it pass up into and fill the interior of the cooking-vessels C, which have covers c upon each of them, whereby their contents are cooked. These perforations may be long and narrow, or round, or of other form. The walls d' of the covers d are enough longer than the upward-projecting walls e in the bottom e' to leave room so these openings will not be covered and closed thereby. The top d of these covers is not perforated, preferably, as thereby, such drippings as might fall on it are prevented from passing below into the water D. These covers may be used, or extra ones may be supplied for covering the openings in the shelf or cover of the vessel A.

We are aware that cooking food by steam is old, and that several vessels arranged one above another, at different levels, have been made use of for that purpose. Our improvement accomplishes this object in several cooking-vessels arranged all on the same level or base.

We claim as our invention as follows:

1. In a mechanical device for heating and cooking by steam, the combination consisting, essentially, of a reservoir, A, having a removable cover or shelf, one or more detachable cooking-vessels, C, the bottoms of which are perforated and have the rim e therein covered with a perforated cap, substantially as and for the purpose mentioned.

2. In a mechanical device for heating and cooking by steam, a combination consisting, essentially, of the heater A and cover B, having in its surface one or more perforations, $b$ $b'$, of the cap or cover $d$, in the flanged wall of which, beneath its top, are openings of one or more vessels, C, each provided in the bottom with a perforation in which is fitted a tube, the ends or flanges of which project above and below said bottom, the top projection of which is of slightly less diameter than the detachable cover or cap $d$, the body of the latter being also of slightly greater diameter than the perforations in the heater-cover B, substantially as and for the purposes described.

NATHAN FORSHAW.
JOSEPH FORSHAW.

Witnesses:
A. E. HUFF,
H. M. THOMPSON.